United States Patent [19]

Woodmansee

[11] 4,315,757
[45] Feb. 16, 1982

[54] COAL GASIFICATION APPARATUS

[75] Inventor: Donald E. Woodmansee, Schenectady, N.Y.

[73] Assignee: General Electric Company, Schenectady, N.Y.

[21] Appl. No.: 168,013

[22] Filed: Jul. 14, 1980

Related U.S. Application Data

[62] Division of Ser. No. 70,637, Aug. 27, 1979, Pat. No. 4,257,782.

[51] Int. Cl.³ .............................................. C10J 3/32
[52] U.S. Cl. .......................................... 48/71; 48/72; 48/77; 48/85.2; 366/147; 366/169
[58] Field of Search ...................... 48/197 R, 200, 201, 48/202, 206, 203, 85.2, 72, 77, 71, 75; 366/147, 169; 432/139, 151

[56] References Cited

U.S. PATENT DOCUMENTS

| 697,867 | 4/1902 | Mond | 48/85.2 |
| 778,614 | 12/1904 | Wellman et al. | |
| 2,194,574 | 3/1940 | Snyder | 48/200 |
| 4,098,586 | 7/1978 | Woodmansee | 48/76 |
| 4,150,953 | 4/1979 | Woodmansee | 48/71 |
| 4,249,828 | 2/1981 | Condolios | 366/169 |

Primary Examiner—Peter F. Kratz
Attorney, Agent, or Firm—Lawrence D. Cutter; James C. Davis, Jr.; Marvin Snyder

[57] ABSTRACT

An improvement in the fixed-bed pressure gasification of coal is described. The improvement includes removing at least a portion of the hydrocarbon (e.g., tar) from the raw gaseous fuel produced in the gasification process and apparatus for introducing the removed hydrocarbon directly into the interior of the coal bed below the devolatilization zone and at or above the maximum-temperature location in the bed.

3 Claims, 5 Drawing Figures

COAL GASIFICATION APPARATUS

This is a division of application Ser. No. 70,637, filed Aug. 27, 1979, now U.S. Pat. No. 4,257,782.

BACKGROUND OF THE INVENTION

The present invention relates to improvements in fixed-bed pressure gasification of coal or other solid carbonaceous fuel to produce fuel gas.

Processes for fixed-bed pressure gasification of coal are well known in the art. In one type of such processes, a pressurized gaseous mixture (commonly referred to as "blast gas" comprising water vapor and free oxygen ($O_2$) is introduced into a lower zone (the ash zone) of a fixed bed of coal and passed upwardly through the bed, which is contained in a suitable gasifier. Coal is introduced into an upper portion of the gasifier and at least partially devolatilized in a devolatilization zone to liberate water, oil and tar from the introduced coal. The at least partially devolatilized coal is thereafter passed to and gasified in a reduction zone disposed below the devolatilization zone. Thereafter, the gasified coal is passed to an oxidation zone disposed below the reduction zone. Heat for the gasification is generated in the oxidation zone by combustion of the carbon remaining in the coal after the gasification thereof.

Thereafter, the ash byproduct produced in the oxidation zone is passed through an ash zone, wherein a stirrer-equipped grate reduces the size of large clinkers as may be required for discharging the coal ash from a lower portion of the gasifier.

The raw gaseous fuel stream exiting the devolatilization zone contains a mixture comprising water, tar and oil.

In practice of the above-described process, prior to end use of the raw gaseous fuel stream, it is subjected to clean-up operations wherein an aqueous liquor comprising water, tar and oil is formed. A gas clean-up system and method suitable for such operations are described by D. E. Woodmansee in U.S. Pat. No. 4,150,953, which is incorporated herein by reference. As described therein, an "oily aqueous blowdown liquid" results from quenching and washing in the clean-up of raw gaseous fuel exiting the gasifier. The integrated coal gasification power plant described therein includes not only the gas clean-up system, but also a water treatment plant for treatment of the waste water exiting the plant.

In the practice of the above-described process, stirring or agitation of the bed at one or more locations is advantageously employed. Thus, a vertically movable upper stirrer is desirably employed for agitating upper portions of the bed (e.g. in the oxidation and reduction zones) to break up cakes formed by gasification of highly caking coals. A second vertically movable stirrer which is rotatably operable in relatively lower and relatively upper positions is advantageously employed to both promote the discharge of the dry ash from the ash zone and agitate or stir the bed immediately under the combustion zone in the aforesaid relatively lower and upper positions, respectively. A grate-and-rabble arm construction wherein the rabble arm serves as the aforesaid second movable stirrer is described in U.S. Pat. No. 4,098,586 (D. E. Woodmansee), which is incorporated herein by reference.

It would be advantageous to have improvements in the above-described process and corresponding apparatus, wherein at least a substantial fraction of at least one of the volatile tar and oil contained in the raw gaseous fuel exiting the gasifier would be recovered therefrom, recycled to the gasifier without premature cracking, and cracked in the gasifier to form coke and fixed, normally non-condensable fuel gases (i.e., carbon monoxide and low molecular weight hydrocarbons having, e.g. from 1 to about 4 carbon atoms per molecule) with revaporization of at most a minimal portion of the tar or oil per se.

It has now been found by practice of the present invention that such improvements are provided, whereby the BTU-value of the resulting fuel gas can be increased in simple, efficient manner.

DESCRIPTION OF THE INVENTION

Generally stated, in one aspect of this invention there is provided an improvement in the above-described process. The improvement comprises removing at least a portion of the hydrocarbon (e.g. tar) from the raw gaseous fuel and introducing the removed hydrocarbon directly into the interior of the bed below the devolatilization zone and at or above the maximum-temperature location, which typically occurs in the oxidation zone. The removing and introducing steps are carried out while substantially preventing cracking of the hydrocarbon into coke. The introduced hydrocarbon is cracked into lower molecular weight products with at lest a portion thereof remaining in the raw gaseous fuel.

BRIEF DESCRIPTION OF THE DRAWING

Practice of the present invention will be more fully understood by referring to the following detailed description taken with the accompanying drawing, which illustrates the best mode contemplated for carrying out the invention.

In the drawing, wherein like numerals refer to similar elements throughout.

DETAILED DESCRIPTION OF THE INVENTION AND MANNER AND PROCESS OF MAKING AND USING IT

Figure 1:
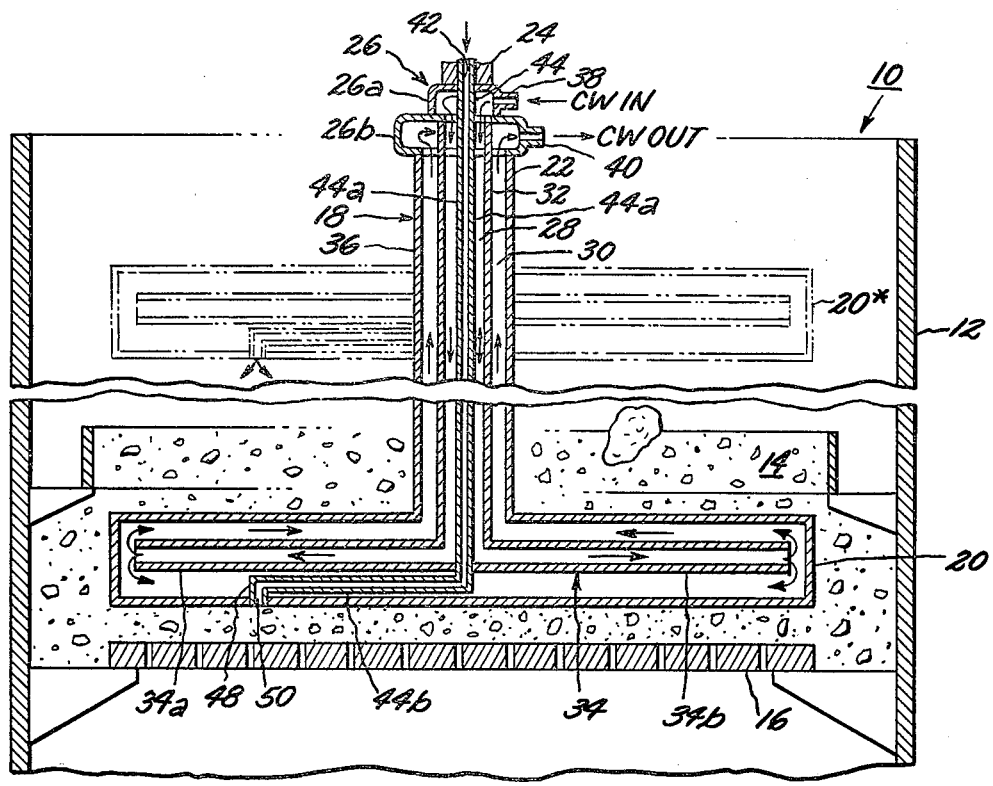
FIG. 1 is a fragmentary elevation view, partly in section, illustrating a fixed-bed gasifier including a preferred embodiment of the hydrocarbon-introduction structure of the present invention as a component thereof.
Figure 2:
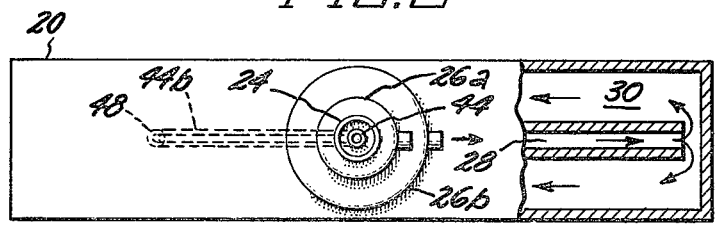
FIG. 2 is a plan view of the hydrocarbon-introduction structure of FIG. 1.

Referring now to the drawing and particularly FIGS. 1 and 2, there is shown fixed bed coal gasifier 10 having a housing which consists of wall 12, which may be a refractory lining within a metal housing. Alternatively, the wall construction may include a pair of spaced walls which together define a cooling wall jacket. For simplicity, only the lower portion of the gasifier and coal bed 14 contained therein is shown. The bed 14 is supported preferably by stationary platform 16 included as a component of grate construction or assembly 18 which further includes rotatable means illustrated by rabble arm 20 mounted on composite shaft 22 for rotation of the arm adjacent the upper surface of the platform in a lower operating position of the rabble arm or stirrer.

Portions of the gasifier which are not illustrated in the drawing may be of any well known construction, as shown for example, in U.S. Pat. No. 2,440,940 (Galusha), U.S. Pat. No. 3,454,382 (Hamilton), and U.S. Pat. No. 2,808,321 (Junkers).

The shaft 22 includes upper or main shaft portion 24 which is operably connected to drive means (not shown) adapted to independently rotate the shaft and raise or lower same as desired. The upper shaft portion is connected by welding or other suitable fastening means at a lower end thereof to the upper end of triple-flow rotary union 26, which constitutes the upper end of a coolant-carrying lower portion of the shaft connecting the upper portion thereof to the rabble arm.

The combination of the rabble arm and the coolant-carrying portion of the shaft includes first and second coolant-carrying flow volumes 28 and 30, each flow volume being of inverted T-shape in longitudinal cross-section. The first flow volume 28 is defined in part by hollow shaft 32, which is connected at its upper end to head member 26a of the rotary union and depends therefrom axially of the composite shaft. The hollow shaft 32 terminates in a transversely extending conduit 34 which forms two extensions 34a and 34b of this shaft. These extensions extend radially outwardly from the upright portion of the hollow shaft 32.

The hollow shaft andits radial extensions may be, and preferably are, circular in cross-section, i.e. circular in sections taken transversely of their longitudinal extents.

The second flow volume 30 is defined in part by hollow shaft 36, which is disposed radially outwardly of, and coaxially with the hollow shaft 34. The hollow shaft 36 is connected at its upper end to head member 26b of the rotary union and depends therefrom axially of the composite shaft. The upper end of the head member 26b is connected to the lower end of the head member 26a by any suitable means, e.g. one or more welds. The hollow shaft 36 terminates in (or has secured thereto) the transversely extending wall of the hollow rabble arm, which terminates in a pair of closed outer ends with each end spaced radially outwardly of the corresponding or adjacent open end of conduit 34.

Figure 3:
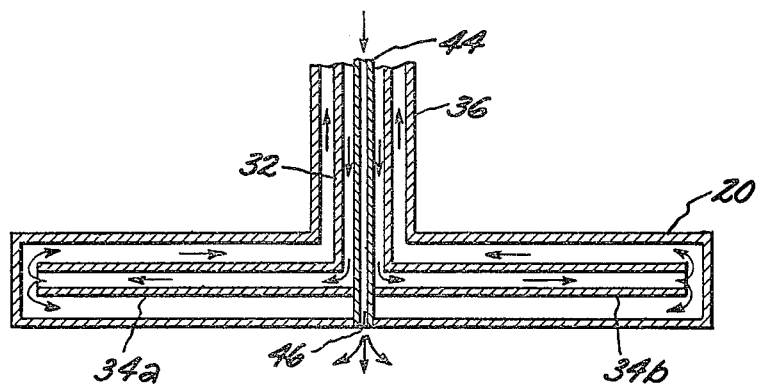
FIG. 3 is a fragmentary elevation view, in section, illustrating another embodiment of the introduction structure.

The head members 26a and 26b are provided with ports 38 and 40, respectively, for introduction and discharge of a coolant, e.g. cooling water ("CW" in the drawing). The flow of coolant sequentially through flow volumes 28 and 30 is schematically illustrated by the arrows shown in these flow volumes (FIGS. 1-3), which are in flow communication via the open radially outer ends of the conduit 34.

The flow of cooling water or other suitable coolant sequentially through flow volumes 28 and 30 serves to maintain the temperature at each location on the composite shaft and rabble arm below the temperature of the coal bed adjacent thereto.

The upper shaft portion 24 has bore or opening 42 extending longitudinally and coaxially thereof, and preferably includes conduit 44 mounted coaxially in the bore. The boremounted conduit includes an axially extending extension or conduit portion 44a which extends through an opening in the transverse conduit 34. The axially extending extension may terminate in port 46 (FIG. 3) located in the center of the lower wall of the rabble arm for introducing tar or other hydrocarbon into the coal bed. However, the axial extension preferably terminates in radially extending additional extension 44b of the bore-mounted conduit as shown in FIGS. 1 and 2. The radial extension 44b terminates in spout 48, which in turn terminates in port 50 located in a radially spaced location of the lower wall of the rabble arm. Except for location, the ports 46 and 50 may be identical in construction. The preferred structure illustrated in FIGS. 1 and 2 advantageously serves to more quickly distribute the introduced tar, oil, or both tar and oil into the coal bed.

It will be appreciated that the hydrocarbon (tar, oil, or both) being introduced into the coal bed is supplied from any suitable flowable source thereof via the flow volume defined by the inner conduit 44 and its extension or extensions described above.

The above-described flow of coolant additionally serves to both (a) at least minimize revaporization of the tar and/or oil being introduced or recycled to the coal bed and (b) substantially prevent cracking of the tar and/or oil in the flow volume provided for the introduction thereof directly into the interior of the coal bed.

The operation of the above-described introduction system (hereinafter referred to as the "tar introduction system" for simplicity) is described in greater detail below with further refernce to FIGS. 4 and 5.

Figure 4:
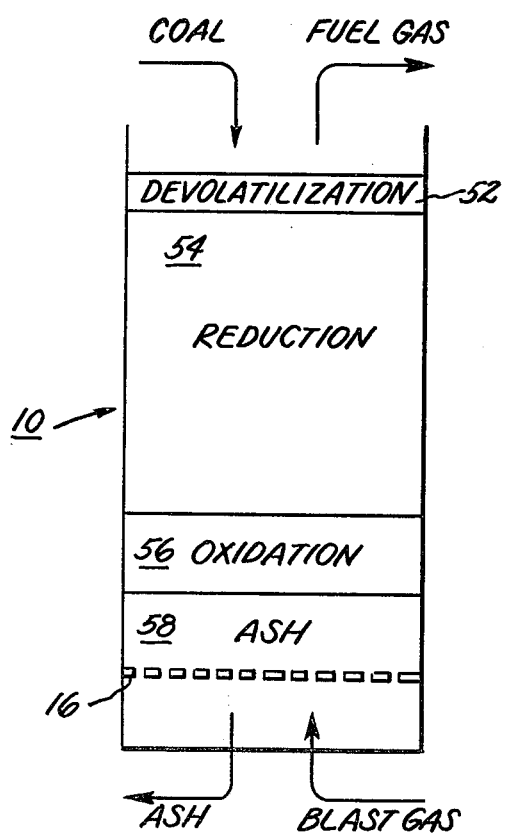
FIG. 4 is an elevation view of the bed-containing portion of a fixed-bed coal gasifier, schematically illustrating various zones of the coal bed.

In heretofore known manner and as schematically illustrated in FIG. 4, coal to be gasified is introduced into the gasifier 10 via upper or devolatilization zone 52 of the previously charged coal bed. Blast gas, i.e. a pressurized gaseous mixture comprising water vapor (i.e. steam) and free oxygen ($O_2$) is introduced into the gasifier via lower or ash zone 58 of the bed and passed upwardly therethrough. The free oxygen may be introduced as $O_2$ per se or a component of air. The coal is successively passed downwardly through coal reduction zone 54, coal oxidation zone 56, and the ash zone 58, from which discharge of the relatively dry ash is promoted by rotation of the rabble arm in the lower position thereof illustrated in FIG. 1.

These zones result from the various reactions between the coal and the upwardly passing blast gas, with the coal or its components undergoing well known chemical and physical changes. One such change which is pertinent to this invention is evaporation from the coal in zone 52 of at least one hydrocarbon from the group consisting of tar and oil. Typically, both tar and oil are so evaporated. The thus-liberated hydrocarbon vapor is included in the raw fuel gas exiting the gasifier.

In the process of the present invention, the aforesaid at least one hydrocarbon is recovered or removed from the raw fuel gas. Such recovery or removal may be of the hydrocarbon alone or of the hydrocarbon in admixture with one or more other removed components.

After removal of the hydrocarbon, at least a portion thereof is supplied under requisite pressure to the inlet of the flow volume defined by the tar-conducting conduit 44, which conducts the so supplied hydrocarbon through the latter flow volume with the requisite cooling described above and introduces the thus controlled-temperature hydrocarbon directly into the interior of the coal bed at the preselected axial position of the rabble arm.

The hydrocarbon being introduced may be obtained in any suitable form. A first suitable form is an aqueous slurry including tar, which slurry may be obtained for example from the high-level side of the tar system ( or decanter) illustrated in the above-cited U.S. Pat. No. 4,150,953 and described in especially pertinent part at column 5, lines 5-9 thereof. A *second* suitable form is an aqueous liquid such as that discharged from the low-level side of such tar system and described in column 4, lines 26-32 of that patent as being passed optionally through an "oily liquor blowdown heater" and "finally into the blast humidifier." A *third* suitable form is the "oily aqueous blowdown liquid" collected in the quench unit as described at column 3, lines (8-30) of the U.S. Pat. No. 4,150,953. A fourth suitable form is a modification of the third form, hwerein additional blowdown liquid is included therewith—the additional liquid being collected from subsequent operations in the clean-up system as described in the U.S. Pat. No. 4,150,953, e.g. at column 3, lines 31-34 thereof.

A generally preferred form is the above-described "second suitable form." In this form, the aqueous liquid is a heavy tar laden liquor which is advantageously introduced via the cooled composite shaft directly into the reduction zone (see FIG. 4), and preferably near the top thereof for maximum cracking of the hydrocarbons (e.g. tar) and recovery of the fuel value thereof in the raw fuel gas.

Another preferred introduction location is in the oxidation zone, preferably near the top thereof. Introduction in this location beneficially results in both cracking the introduced hydrocarbons and converting substantially all the water in the aqueous liquid to water vapor, reaction products thereof, or both, thereby substantially eliminating need for waste water treatment.

The removed hydrocarbon is introduced at a desired height in the bed by vertically positioning the shaft (and thereby the rabble arm) such that the discharge port is at such height. In FIG. 1, an upper position of the rabble arm is illustrated in phantom view at 20*. Such position may be, for example, in the reduction zone, oxidation zone, etc. schematically illustrated in FIG. 4.

Figure 5:
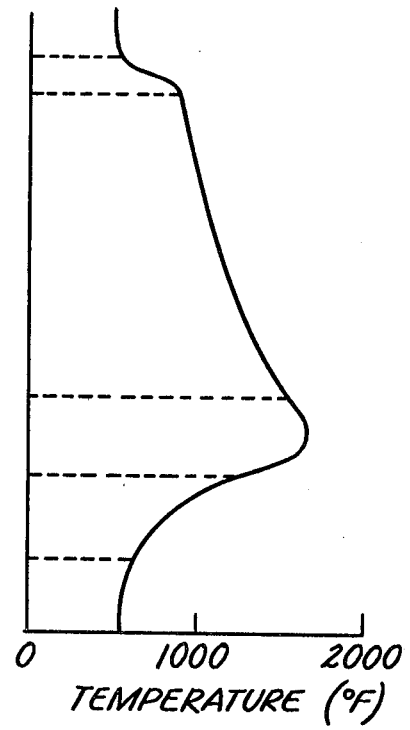
FIG. 5 is an illustrative temperature graph, illustrating the temperature profile of the gaseous mixture passing through the bed of FIG. 4 as a function of the vertical location in the bed.

FIG. 5 illustrates a typical temperature profile of the gas being passing upwardly through the bed. The blast gas may be introduced at an initial temperature of, e.g. about 500° to 600° F., rising to a maximum of e.g. about 1900° to 2000° F. in the oxidation zone, decreasing gradually in the reduction zone to about 1200° to 1500° F. and thereafter decreasing in the devolatilization zone to, e.g. about 900° to 1200° F.

The coal is introduced at any suitable temperature of, e.g. about 500° to 600° F., with the ash being discharged at about 500° to 600° F. Above the height in the ash zone where the ash and upwardly passing gas are at about the same temperature, the coal bed temperature at each elevation in the bed may be, e.g. about 50°-200° F. lower than the temperature of the gas at such elevation. The coolant may be supplied at about 150° to 200° F.

It is to be understood that the foregoing detailed description is given merely by way of illustration and that many variations can be made therein without departing from the spirit or scope of this invention.

What is claimed is:

1. An apparatus for fixed-bed pressure gasification of coal comprising:
   a closed housing;
   a grate disposed near the bottom of said housing for supporting a coal bed charge within said housing;
   means for introducing steam and oxidant into said housing near the bottom thereof;
   a stirrer having a shaft and a rabble arm mounted thereon for rotation thereof through said coal bed, said stirrer having closed conduit means for conducting a flow of coolant through said shaft and said rabble arm without discharge of any coolant into said bed; and
   means for conducting a separate flow of hydrocarbon through said shaft in indirect heat exchange relationship with and substantially surrounded by said coolant flow, said hydrocarbon conducting means having means for discharging cooled hydrocarbon into the interior of said bed.

2. An apparatus as in claim 1 wherein said cooled hydrocarbon discharging means is disposed off-centered from the axis of rotation of said stirrer.

3. An apparatus as in claim 2 wherein said discharging means includes an outlet port of said conducting means disposed in said rabble arm in flow communication with the interior of said bed.

* * * * *